(12) United States Patent
Willhelm

(10) Patent No.: US 6,429,940 B1
(45) Date of Patent: Aug. 6, 2002

(54) OPTICAL POSITION MEASURING SYSTEM EMPLOYING A SCALE WITH MULTIPLE PARTIAL MEASURING GRADUATIONS HAVING DIFFERENT GRADUATION PERIODS

(75) Inventor: Jörg Willhelm, Wetzlar (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/512,553

(22) Filed: Feb. 24, 2000

(30) Foreign Application Priority Data

Feb. 26, 1999 (DE) .......................................... 199 08 328

(51) Int. Cl.⁷ ................................................ G01B 9/02
(52) U.S. Cl. .................................. 356/499; 250/237 G
(58) Field of Search ................................ 356/488, 494, 356/499; 250/237 G, 231.14, 231.18

(56) References Cited

U.S. PATENT DOCUMENTS

| | | |
|---|---|---|
| 4,091,281 A | 5/1978 | Willhelm et al. |
| 4,101,764 A | 7/1978 | Nelle |
| 4,363,964 A | 12/1982 | Schmitt |
| 4,385,836 A | 5/1983 | Schmitt |
| 4,459,750 A | 7/1984 | Affa |
| 4,776,701 A | 10/1988 | Pettigrew |
| 5,061,073 A | 10/1991 | Michel |
| 5,079,418 A | 1/1992 | Michel et al. |
| 5,120,132 A | 6/1992 | Spies et al. |
| 5,206,704 A | 4/1993 | Huber et al. |
| 5,333,048 A | 7/1994 | Michel et al. |
| 5,574,560 A | 11/1996 | Franz et al. |
| 5,680,211 A * | 10/1997 | Kaneda et al. ............... 356/499 |

FOREIGN PATENT DOCUMENTS

| | | |
|---|---|---|
| DE | 24 31 551 | 2/1976 |
| DE | 39 05 730 | 8/1990 |
| DE | 40 06 365 | 10/1991 |
| EP | 0 163 362 | 12/1985 |
| EP | 0 603 905 A2 | 6/1994 |
| EP | 0 603 905 A3 | 7/1996 |
| WO | WO 89/05964 | 6/1989 |

OTHER PUBLICATIONS

J. Willhelm, "Dreigitter–schrittgeber" (Three–grating Incremental Transducer), dissertation at TU (Technical University) Hannover, pp. 41, 43, 45, 46, 78, 82, 85, 1978.

A. Spiess, "Langen in der Ultra–prazisionstechnik messen" (Measuring Length by Means of Ultra–Precision Technology), *Feinwerktechnik & Messtechnik 98* (Mechanical Precision Technology and Measuring Technology), No. 10, pp. 406–410, 1990.

Nauman/Schroder, instruction manual entitled "Bauelemente der Optik" (Optical Components), published by Carl Hanser Verlag, 6th Edition, pp. 296–297, 1992.

* cited by examiner

*Primary Examiner*—Samuel A. Turner
(74) *Attorney, Agent, or Firm*—Brinks Hofer Gilson & Lione

(57) ABSTRACT

An optical position measuring system including a scale that has at least two partial measuring graduations that have different graduation periods and a scanning unit that is movable relative to the scale along a measuring direction. The scanning unit includes a light source that emits light beams, a reflector element and a detector element, wherein the light beams emitted by the light source are deflected several times by the reflector element in the direction of the course of propagation of the emitted light beams and impinge several times on said scale before they impinge on said detector element, on which scanning signals, which are modulated as a function of displacement, are detected.

25 Claims, 7 Drawing Sheets

PRIOR ART

FIG. 8
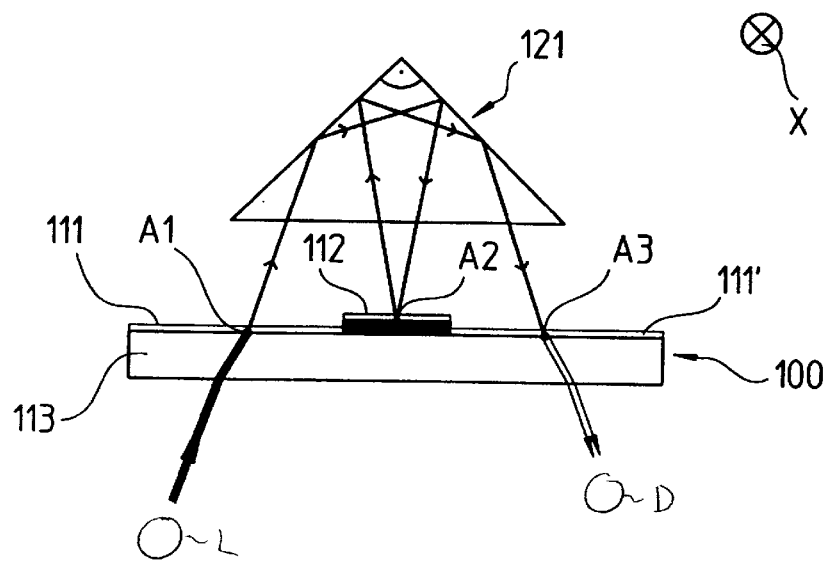
FIG. 9a  FIG. 9b  FIG. 9c
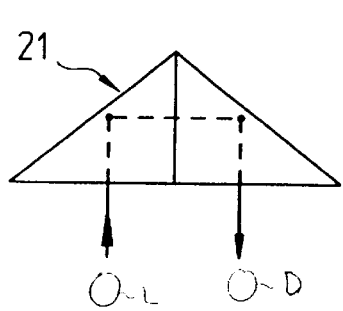
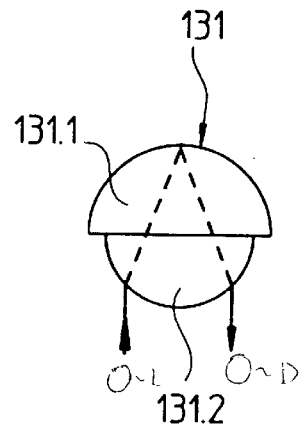
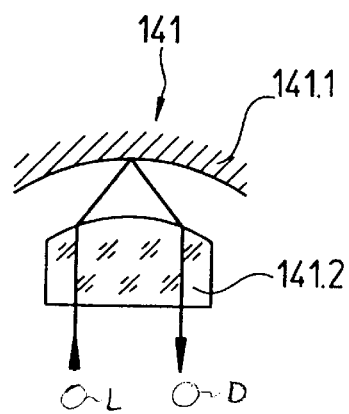

OPTICAL POSITION MEASURING SYSTEM EMPLOYING A SCALE WITH MULTIPLE PARTIAL MEASURING GRADUATIONS HAVING DIFFERENT GRADUATION PERIODS

Applicant claims, under 35 U.S.C. §119, the benefit of priority of the filing date of Feb. 26, 1999 of a German patent application, copy attached, Ser. No. 199 08 328.2, filed on the aforementioned date, the entire contents of which is incorporated herein by reference.

BACKGROUND OF THE INVENTION

1. Field of the Invention

The invention relates to an optical position measuring system having at least one scale and a scanning unit, which is movable relative thereto, and includes a light source, a reflector element, as well as at least one detector element, wherein the light beams emitted by the light source are deflected several times by the reflector element in the direction of the course of propagation and impinge several times on the at least one detector element, on which scanning signals, which are modulated as a function of displacement, can be detected.

2. Discussion of Related Art

A position measuring system in accordance with the species is known from WO 89/05964. An optical position measuring system, which is based on an interferential three-grating incremental transducer principle is proposed in this document; FIG. 1 shows the basic design of this position measuring system. It includes a scale M with an incremental measuring graduation MT, as well as a scanning unit A, which can be moved relatively thereto in the measuring direction x. A light source L, a reflector element R, as well as several detector elements D and, if required, further signal processing elements, are essentially arranged in the scanning unit. In the course of the beam propagation, the light beams emitted by the light source L impinge several times on the measuring graduation MT and the reflector element R before interfering partial light beams are deflected in the direction toward the detector elements D following the last reflection. In case of a relative motion of the measuring graduation MT in relation to the scanning unit A, periodically modulated incremental scanning signals are present at the detector elements D, which can be evaluated in a known manner. The resulting signal period SP of the scanning signals is SP=TP/4 in this position measuring system, where TP identifies the graduation period of the measuring graduation MT.

The described design of this optical interferential position measuring system in accordance with the so-called three-grating incremental transducer principle now offers particular advantages as far as the insensitivity to twisting of the scanning unit A in respect to the scale M is concerned. However, it is considered to be disadvantageous that a signal multiplication by only a factor of four results; moreover, the resulting signal modulation on the detector side is not sufficiently large. The reason for the latter lies in that there is the absolute requirement of designing the measuring graduation MT as a phase grating with a phase depth of $\Delta\phi=\lambda/2$, which results in the appearance of a zeroth order of diffraction after the light beams have impinged on the measuring graduation MT. In turn, the zeroth order of diffraction acts as a constant light level for the detected scanning signals, which results in an undesired reduction of the signal modulation in the end.

Further optical position measuring systems designed as interferential three-grating incremental transducers are known from EP 0 163 362 B1, as well as from DE 24 31 551.

In this connection, FIG. 2 shows the extended beam path, as well as various important optical values, in accordance with the system of EP 0 163 362 B1. Furthermore, the position measuring system in the document mentioned has been extensively described in the publication of A. Spiess with the title "Längen in der Ultra- präzisionstechnik messen" [Measuring Length by Means of Ultra- Precision Technology] in Feinwerktechnik & Me technik 98 [Mechanical Precision Technology and Measuring Technology], No. 10, pp. 406 to 410.

The light beams coming from a light source, not represented, are split at a first scanning graduation AG into the zeroth, as well as the +/− first order of diffraction. The diffracted partial light beams thereafter reach the measuring graduation M, where another diffraction takes place before, following another passage through the second scanning graduation AG', the split partial light beams come to interference. The scanning graduations AG, AG', as well as the measuring graduation M are here respectively designed as phase gratings. The periodically modulated scanning signals resulting in case of a relative motion of the graduations AG and M are detected on downstream-connected detector elements, not represented.

A ratio of fringe widths w and gap widths f, which differs from 1:1, is provided on the side of the phase grating scanning grating AG. The fringe widths w and gap widths f on the side of the phase grating measuring graduation M have been selected to be identical; the phase depth $\Delta\phi$ of the measuring graduation M is $\lambda/2$, which in the end assures a satisfactory modulation degree of the scanning signals on the detector side. Otherwise, the graduation periods d of all graduations M, AG, AG' involved have been selected to be identical.

The basic beam path of the system from DE 24 31 551 is sketched in FIG. 3. Reference is furthermore made in connection with this variation of an interferential three-grating incremental transducer to Ch. 4 of a dissertation of J. Wilhelm "Dreigitter-schrittgeber" [Three-grating Incremental Transducer] of the TU [Technical University] Hannover, 1978.

All gratings AG, AG', M used in the optical position measuring system proposed therein are designed as phase gratings with a phase depth $\Delta\phi=\lambda/2$, which again assures high efficiency. Here, the graduation periods $d_{AG}$, $d_{AG'}$, of the scanning graduation(s) AG, AG' have been selected to be twice as large as the graduation period $d_M$ of the measuring graduation M. All gratings AG, AG', M used respectively have fringe and gap widths of the same size. Because of the phase depth $\Delta\phi=\lambda/2$ in all graduations, this system assures the suppression of the zeroth order of diffraction, and therefore provides a good degree of modulation of the scanning system.

However, it must be noted as disadvantageous in connection with this, as well as with the previous discussed optical measuring system, that both systems are relatively sensitive to twisting and tilting of the scanning unit in respect to the scale, i.e. such possible twisting during the measuring operation results in incorrect measurements.

OBJECT AND SUMMARY OF THE INVENTION

It is therefore an object of the present invention to disclose a position measuring system that is insensitive to a large extent to possible twisting of the scanning unit in respect to the scale. Moreover, satisfactory signal modulation, as well as the greatest possible signal multiplication, are desirable.

An optical position measuring system meeting these requirements includes a scale that has at least two partial measuring graduations that have different graduation periods and a scanning unit that is movable relative to the scale along a measuring direction. The scanning unit includes a light source that emits light beams, a reflector element and a detector element, wherein the light beams emitted by the light source are deflected several times by the reflector element in the direction of the course of propagation of the emitted light beams and impinge several times on said scale before they impinge on said detector element, on which scanning signals, which are modulated as a function of displacement, are detected.

The steps in accordance with the present invention now substantially guarantee that the desired insensitivity to twisting during measuring operations is assured, as well as a satisfactory degree of modulation of the resulting scanning signals. The signal multiplication, i.e. the ratio of the graduation period and the signal period of the scanning signals, which can be achieved by means of the optical position measuring system of the invention, is moreover also greater than with the discussed systems in accordance with the prior art.

Furthermore, a number of embodiment options exists within the scope of the present invention. Thus, linear, as well as rotary measuring systems can of course be realized on the basis of the present invention. In the same way, combinations of different measuring graduation variations can be used, for example systems consisting of incident light and transmitted light measuring graduations, etc. Furthermore, many possibilities exist for adapting the present invention to the most different measuring conditions.

Further advantages, as well as details of the optical position measuring system in accordance with the invention ensue from the subsequent description of several exemplary embodiments by means of the attached drawings.

BRIEF DESCRIPTION OF THE DRAWINGS

FIG. 8 is a side view of a fourth embodiment of an optical position measuring system in accordance with the present invention;

FIGS. 9a to 9c each schematically represent an embodiment of a suitable reflector element for the embodiments of FIGS. 4–8;

DETAILED DESCRIPTION OF THE PREFERRED EMBODIMENTS

Figure 4:
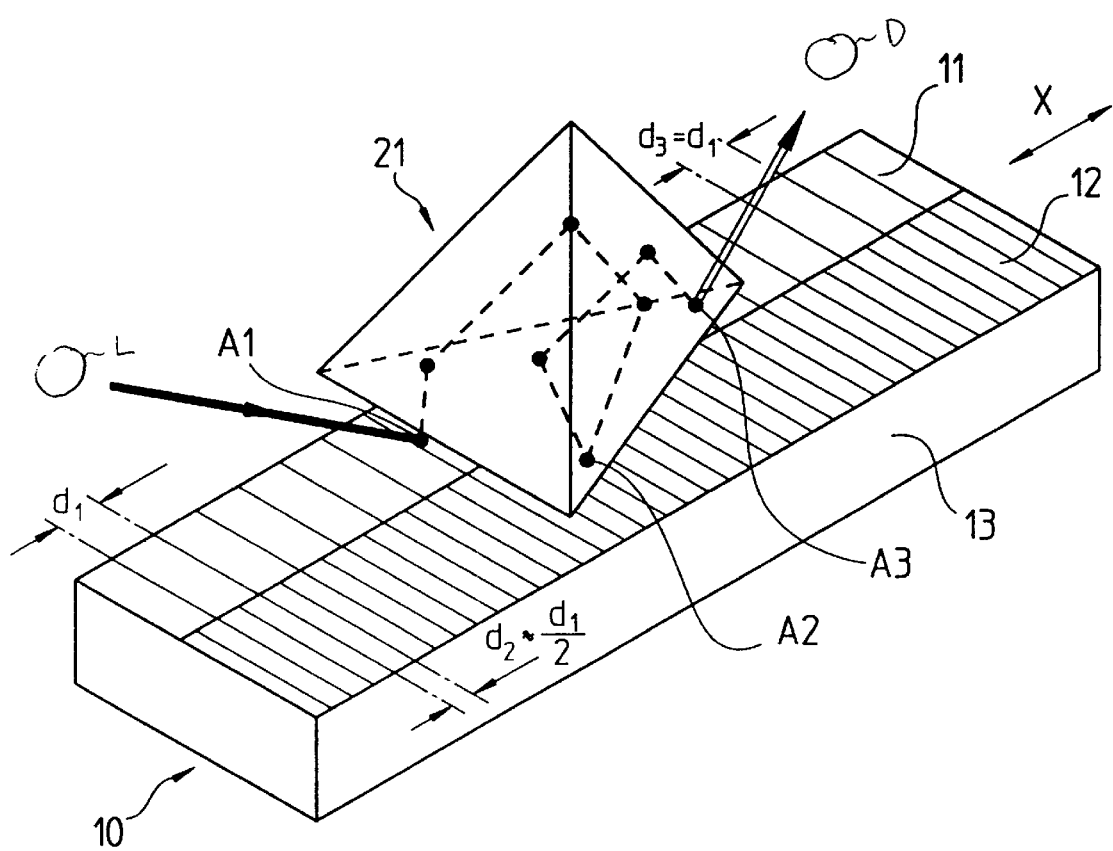
FIG. 4 is a perspective partial view of a first exemplary embodiment of an optical position measuring system in accordance with the present invention.

The basic thoughts in connection with the invention will be explained by means of a first exemplary embodiment, which is schematically represented in FIG. 4.

Figure 1:
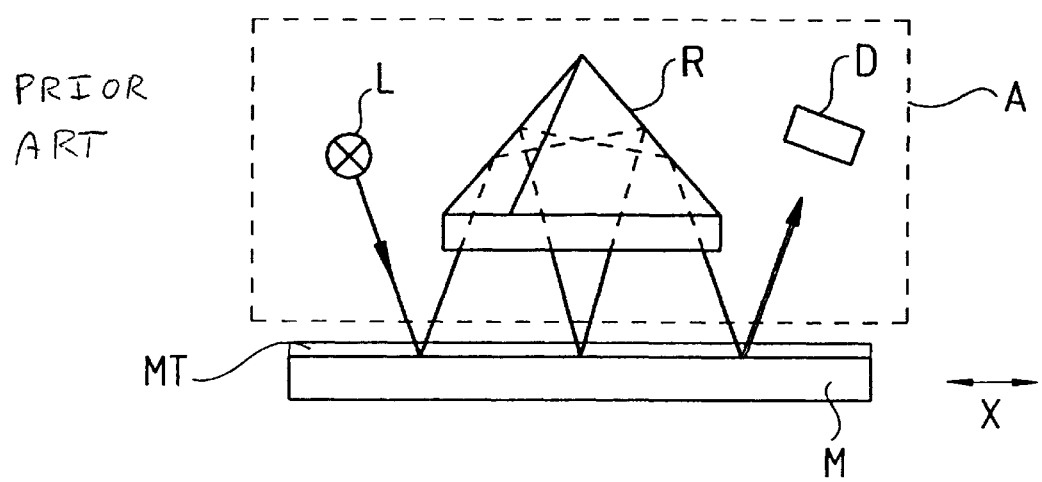
FIGS. 1 to 3 respectively show representations in regard to the above-discussed prior art.
Figure 2:
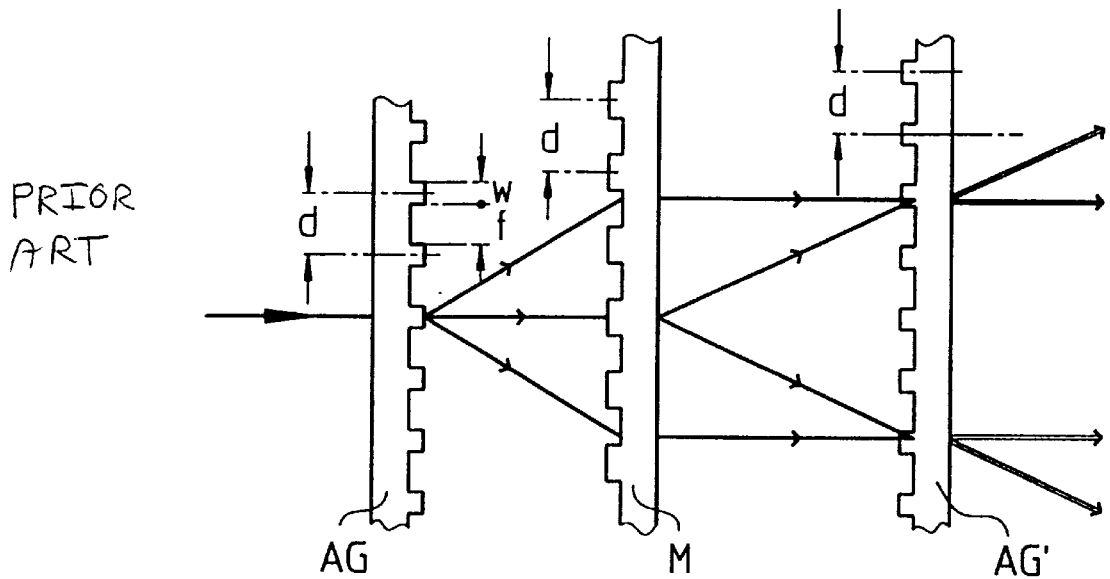
Figure 3:
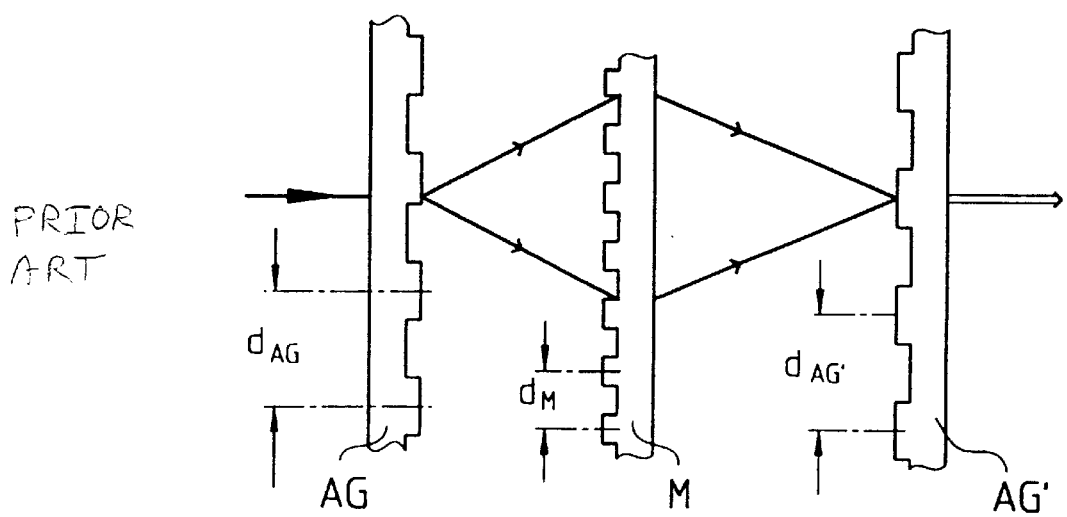

For reasons of greater clarity, only a portion of the optical position measuring system in accordance with the present invention is represented here in FIG. 4. In principle, the optical position measuring system comprises a scanning unit, as well as a scale, i.e. the basic layout is approximately identical with that in FIG. 1. Only the scale 10, as well as a portion of the scanning unit, namely a reflector element 21 which is movable with respect to it in the measuring direction x, are shown in FIG. 4. As a rule, the scanning unit also includes a light source L, as well as one or several detector elements D, through which the scanning signals, which have been modulated as a function of their displacement, are detected in case of a relative movement between the scale 10 and the scanning unit. Moreover, various optical elements, such as lenses etc., can be provided for the beam guidance on the part of the scanning unit, all of which, the same as the other components, are arranged in a suitable housing, also not represented, such as had already been generally sketched in FIG. 1.

However, the design of the scale 10, as well as that of the scanning light beam path, which in the end is primarily affected by the reflector element 21, are important for the present invention. On the side of the scale 10, two adjoining partial measuring graduations 11, 12, each of which extends in the measuring direction x, are arranged on a scale support body 13. The two partial graduations 11, 12 are embodied as incident light incremental graduations and have periodically arranged partial areas with different optical reflecting properties in the measuring direction x. In an advantageous embodiment, both partial measuring graduations 11, 12 are designed as phase gratings which suppress the zeroth order of diffraction, which can be achieved in a known manner by the selection of the phase depth $\Delta\phi=\lambda/2$.

It is furthermore important for the present invention that the two partial measuring graduations 11, 12 have different graduation periods $d_1$, $d_2$. Thus, the measuring graduation identified as the first measuring graduation 11 in what follows has a coarser graduation period $d_1$ than the adjoining second partial measuring graduation 12, which has the graduation period $d_2$. Actually, $d_2 \approx d_1/2$ was selected in the first exemplary embodiment. In this connection it can be generally stated that basically a certain deviation from the exact relationship $d_2=d_1/2$ is possible within the scope of the present invention.

The light beams coming from the light source first reach the first measuring graduation 11 with the coarser graduation period $d_1$ and are diffracted by reflection a first time at the first impingement location A1. Subsequently, the reflected and diffracted partial light beams impinge on a reflecting partial surface of the reflector element 21. In the embodiment represented, the reflector element 21 is designed inter alia as a triple prism. Following one or several reflections at the reflector element 21, the partial light beams are deflected toward the second impingement location A2 on the scale 10, wherein the second impingement location A2 on the scale 10 is now located in the second measuring graduation 12. From here a reflection and diffraction of the impinging partial light beams in the direction toward the reflector element 21 takes place again. Because of the above mentioned selection of the graduation periods $d_1$, $d_2$, and therefore because of the so-called Littrow condition which is met by this, it is assured that a diffraction and retroreflection of the partial light beams from the second impingement location A2 essentially takes place within itself. The partial light beams coming from the second impingement location A2 are again deflected by the reflector element 21 in the direction toward the scale 10, on which they impinge at the third impingement location A3 in the area of the first measuring graduation 11. Finally, another reflection of partial light beams capable of interference takes place from the third impingement location A3 toward one or several detector elements which detect the scanning signals, which have been modulated as a function of displacement.

Figure 5:
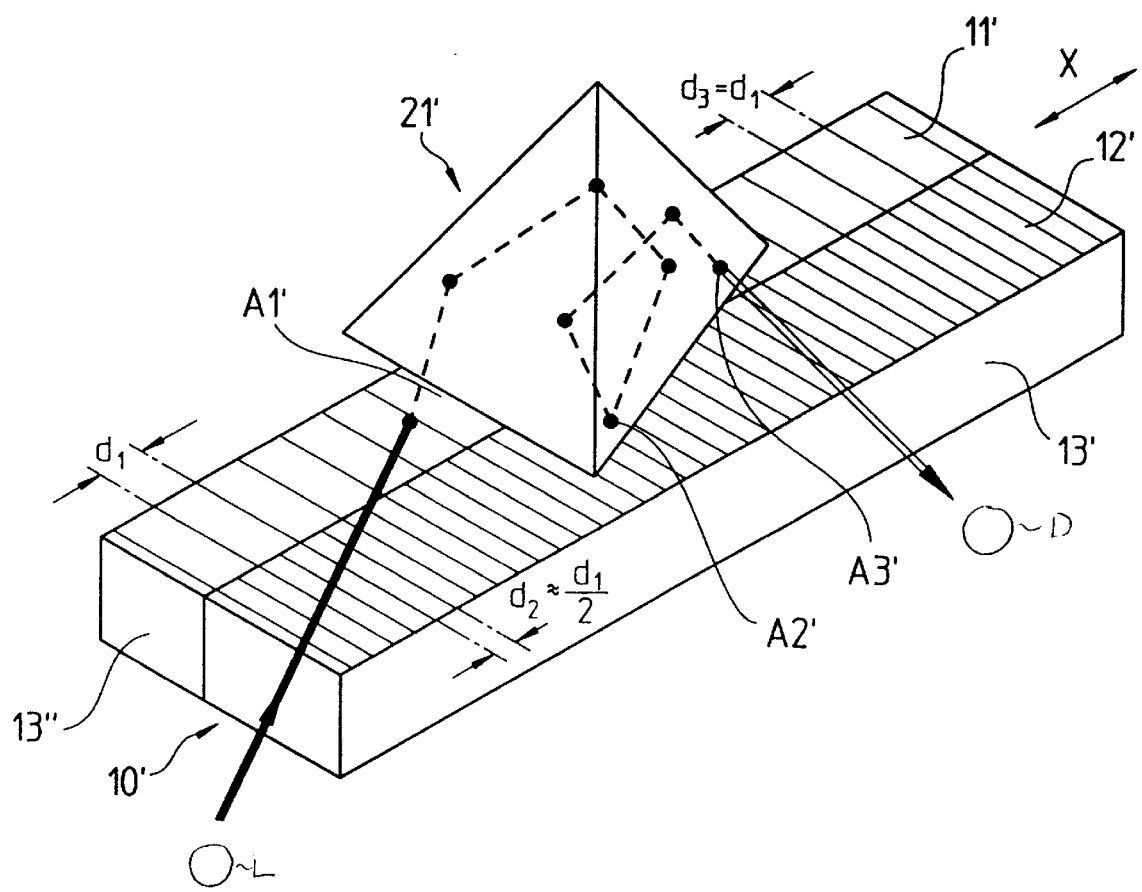
FIG. 5 is a partial perspective view of a second exemplary embodiment of an optical position measuring system in accordance with the present invention.

An only slightly modified second exemplary embodiment of the optical position measuring system of the invention is represented in a partial perspective view in FIG. 5.

The essential difference from the first exemplary embodiment in FIG. 4 can be found in the design of the first partial measuring graduation 11'. This is now designed as a transmitted light incremental graduation, while the second partial measuring graduation 12' is again designed as a reflecting incident light incremental graduation. As above, both partial measuring graduations 11', 12' are again designed as phase gratings. The grating parameters $d_1$, $d_2$ and $\Delta\phi$ for both graduations 11' and 12' can be the same as in the previous example. It should moreover be mentioned that now the first partial measuring graduation 11' is arranged on a transparent support body 13".

A somewhat modified beam path in comparison with the first example results, since the incident light beams reach the first partial measuring graduation 11' from below. From the first impingement location A1' on the first partial measuring graduation 11', the partial light beams diffracted there reach the reflector element 21' and are deflected there in the direction toward the second impingement location A2' on the second measuring graduation 12'. Another diffraction and reflection in the direction toward the reflector element 21' takes place there. The reflector element 21' then again causes the deflection to the third impingement location A3', which again is located on the first partial measuring graduation 11'. The partial light beams, which are combined again at the third impingement location A3' and are capable of interference, thereafter reach the detector elements, not represented, which in this variation are arranged underneath the scale 10', the same as the not represented light source.

Figure 6:
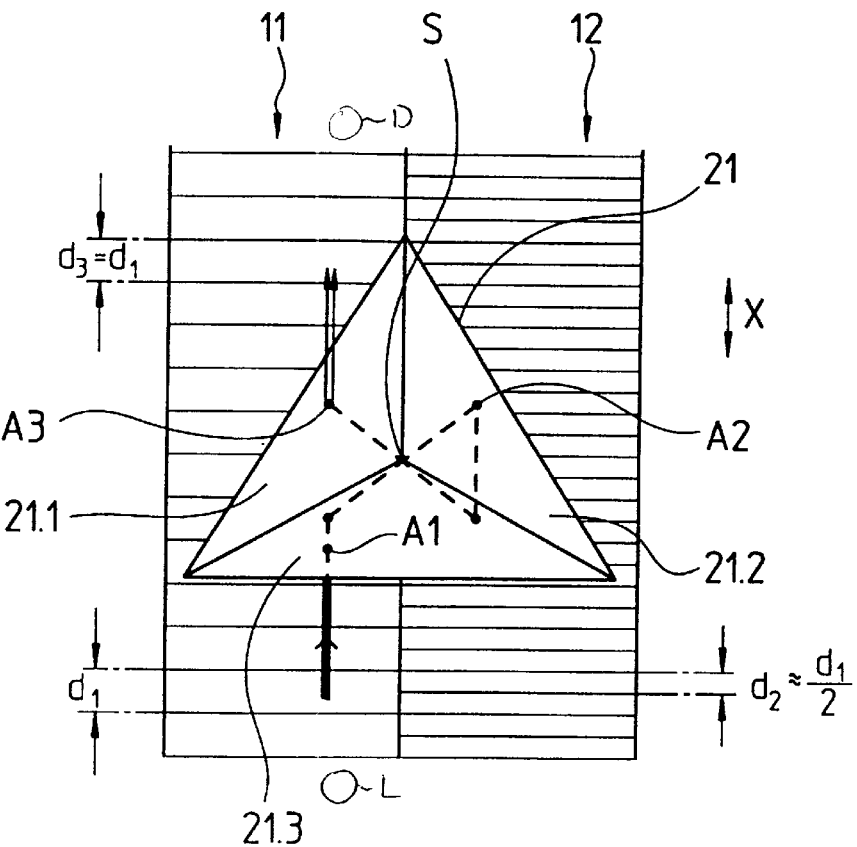
FIG. 6 is a top view of the first exemplary embodiment in FIG. 4.

A view from above on the arrangement in accordance with the first exemplary embodiment is represented in FIG. 6. Incidentally, the course of the beam path in the second exemplary embodiment in FIG. 5 is almost identical to this.

As can be seen in FIG. 6, the light beams reflected and diffracted at the first impingement location A1 in the first partial measuring graduation 11 reach the reflector element 21 and, following reflection at the partial reflecting surfaces 21.1 to 21.3 are reflected back again in the direction toward the impingement location A2 in the second measuring graduation 12. For reasons of greater clarity, the representation of the course of the beam path, known per se, in the reflector element 21 was omitted. A diffraction and reflection takes place again from A2 in the direction toward the reflector element 21. Following renewed multiple reflection at the partial reflector surfaces 21.1 to 21.3, the deflection in the direction toward the third impingement location A3 in the first partial measuring graduation 11 takes place. From the third impingement location A3, the interfering partial light beams then reach one or several detector elements, as mentioned above.

A detailed representation of the light beam paths, i.e. the representation of the different orders of diffraction, etc., has of course also been omitted in FIGS. 4 to 6 for reasons of improved clarity.

As can be seen from FIG. 6, the axis of symmetry S of the retroreflecting reflector element 21, or respectively triple prism, lies between the two partial measuring graduations 11, 12, so that in the end the beam path outlined above results.

A third embodiment of the optical position measuring system of the invention will be explained in what follows by means of FIG. 7, which again represents a view from above on a portion of the scale 53, as well as on the reflector element 61 in the scanning unit.

In contrast to the previously explained example, an incidence of the light beams vertically in respect to the measuring direction x, or respectively parallel with the graduation structures, is now provided, while before the respective direction of incidence was respectively oriented parallel with the measuring direction x, or respectively vertically in relation to the graduation structures.

While the triple prism, however now arranged differently, can in principle again function as the reflector element 61, a different layout of the scale 53 is required. The latter now comprises three partial measuring graduations 51, 52, 51'. The first and third measuring graduations 51, 51' are here designed to be essentially identical, only in the graduation period $d_2$ does the second measuring graduation 52 differ from the two other graduation periods $d_1 \approx d_3$, in that $d_2 \approx d_1/2$ again applies.

However, the beam path basically is again identical to the above explained beam path, i.e. the first partial measuring graduation 51, then the second partial measuring graduation 52 and finally the third partial measuring graduation 51' are sequentially acted upon after appropriate deflections in the reflector element 61. In this case only the fact is different that, because of the light beam being guided vertically in relation to the measuring direction x, a third partial measuring graduation 51' is required, which is essentially embodied identical to the first partial measuring graduation 51. A detailed representation of the deflected beam paths was omitted in this drawing figure for reasons of improved clarity. It should be moreover noted, that now the axis of symmetry S of the triple prism, or respectively of the reflector element 61, lies exactly in the center of the second partial measuring graduation 52.

It should be noted that an advantage of this embodiment rests in that advantageous preconditions for generating phase-shifted signals are provided, since the graduation periods $d_1$ and $d_3$ of the first and third partial measuring graduations 51, 51' need not be exactly identical. By way of amplification, further attention is invited in this connection to page 78 of the above mentioned dissertation of J. Wilhelm "Dreigifterschrittgeber" [Three-grating Incremental Transducer] of the TU Hannover, 1978.

A fourth embodiment of the optical position measuring system of the invention will be briefly outlined in what follows by means of FIG. 8.

Figure 7:
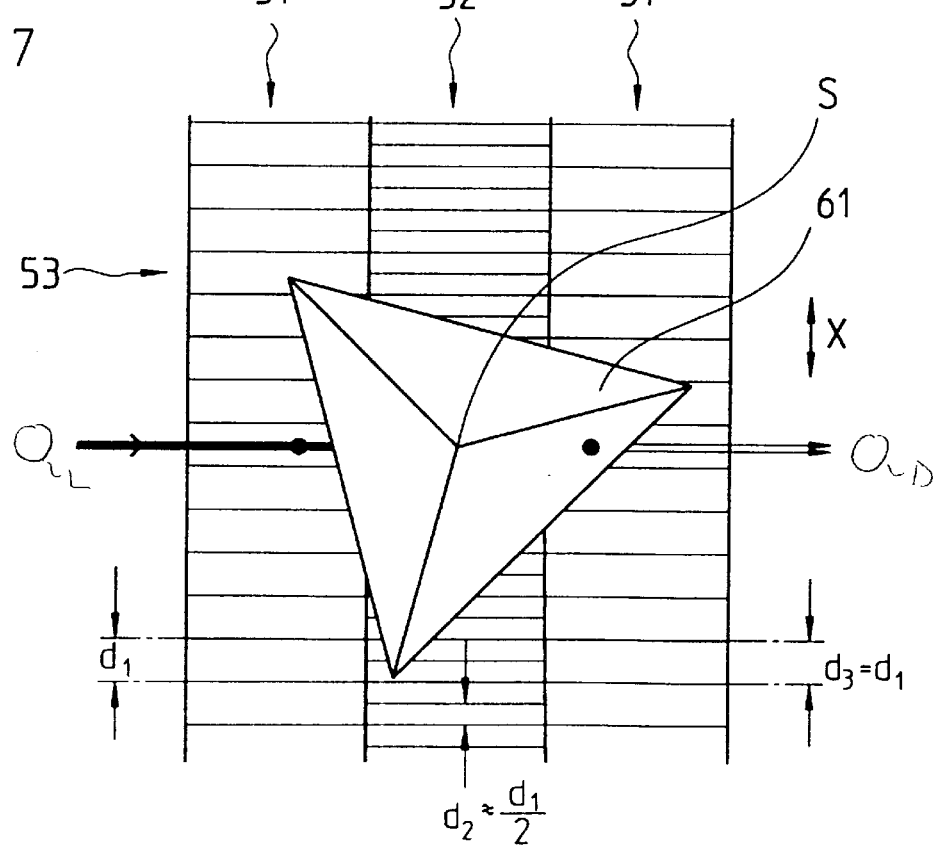
FIG. 7 is a top view of a third embodiment of an optical position measuring system in accordance with the present invention.

In respect to the beam path, this embodiment is in principle comparable to the above explained variation in FIG. 7, wherein the direction of incidence of the light beams coming from the light source is oriented vertically in relation to the measuring direction x.

The orientation of the light beams coming from the light source has also been selected to be identical to this in FIG. 8. Therefore, the measuring direction x extends in the manner shown vertically in relation to the drawing plane, the scale 100 and the scanning unit, or respectively the reflector element 121, are movable in relation to each other in this direction. Therefore, FIG. 8 represents a section through the scale 100, which again has three adjacent partial measuring graduations 111, 112, 111'. Again, not all partial measuring graduations 111, 112, 111' are embodied as incident light incremental graduations. Instead, the first partial measuring graduation 111, the same as the third partial measuring graduation 111', are respectively designed as transmitted light incremental graduations. The second partial measuring graduation 112 arranged between them, however, is embodied as an incident incremental graduation, as in the previous variations. Regarding the different graduation periods, layout of the different graduations, etc., reference is again made to the previous examples.

A triple prism, which deflects the partial light beams coming from the point A1 on the first partial measuring graduation 111 to the point A2 on the second partial measuring graduation, is used as the reflector element 121. The partial light beams coming from the point A2 are again deflected by the reflector element 121 on the point A3 of the third partial measuring graduation 111' before the interfering partial light beams reach the detector elements.

The advantage of such a variant is considered to rest in that an improved energy balance as a whole over the case of the sole use of incident light incremental graduations results because of the customarily fewer losses when employing a transmitted light incremental graduation. Added to this is an improved contrast of the interference fringes generated, because reflecting graduation structures often generate interfering light beams.

Up to now, a triple prism has been used as the reflector element in all described exemplary variations. The use of a triple mirror system with identical effects is of course a complete equivalent of this. However, besides such a reflector element 21, whose basic retroreflecting optical effects are indicated in FIG. 9a, alternatively designed reflector elements here are also considered within the scope of the present invention.

Thus, a so-called "cat's eye", or respectively a ball reflector, which includes of a hemisphere 131.1 mirrored on the inside, as well as a lens 131.2 arranged in front of it, is indicated in FIG. 9b as a further embodiment of the reflector element 131. A relatively cost-effective manufacture in comparison with the somewhat expensive triple prisms is an advantage of such an embodiment of the reflector element 131.

Finally, a further embodiment possibility of the reflector element 141, a so-called Dyson lens, is sketched in FIG. 9c, which includes a ball-shaped reflection surface 141.1 and an optical device 141.2 placed in front of it. With a reflector element embodied in this way, greater flexibility results in case of a correction of various errors which might be required, for example when correcting opening errors.

Further retroreflecting elements, which can respectively be matched to the required reflection beam paths and can be employed with the present invention as deflection elements, are moreover shown, for example, on pages 296–297 of the instruction manual "Bauelemente der Optik" [Optical Components] by Naumann/Schröder, Hanser, publishers, 6th ed., 1992.

Figure 10:
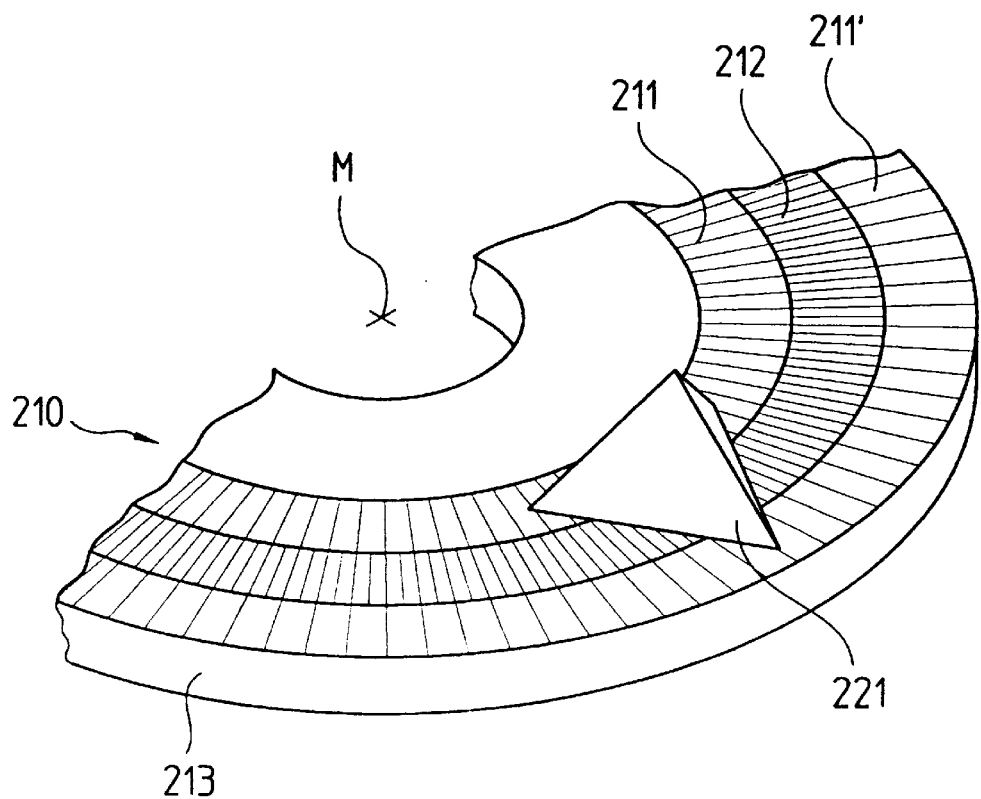
FIG. 10 is a perspective view of a portion of a fifth exemplary embodiment of an optical position measuring system in accordance with the present invention.

A fifth embodiment of the optical position measuring system of the present invention will be explained in what follows by means of FIG. 10. A portion of a rotary measuring system is represented there, based on the thoughts in connection with the present invention.

The scale 210 is embodied as a known graduated disk, which again has three partial measuring graduations 211, 212, 211', on which the light beams act in sequence. The scanning unit, only the reflector element 221 of which is represented in FIG. 10, is movable in relation to the scale 210, or respectively partial disk, around the axis of rotation M. The required light source and the detector element should be arranged radially adjacent to the reflector element 221, i.e. the direction of incidence of the light beam provided by the light source is essentially oriented vertically in relation to the circular measuring direction. Therefore this variation again corresponds in principle to the two exemplary embodiments in FIGS. 7 and 8.

Figure 11:
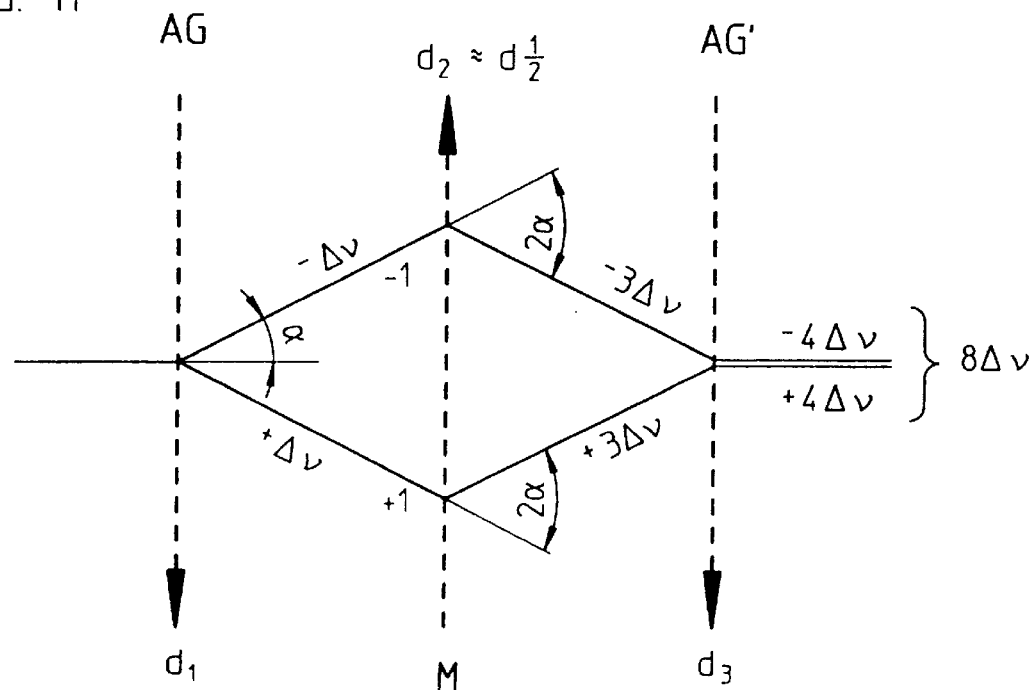
FIG. 11 represents the beam path inside the optical position measuring system in accordance with the present invention in an extended view.

Finally, FIG. 11 shows the extended beam path within the optical position measuring system of the invention, based on the three grating principle.

The light beams coming from a light source, not represented, reach the first partial measuring graduation AG having the graduation period $d_1$. If the first partial measuring graduation AG is moved downward, with partial light beams deflected in the +/− first order of diffraction, because of the Doppler effect, the result is a frequency shift +/− $\Delta v$ as shown, whose amount results in $v/d_1$, if v indicates the velocity at which the first partial measuring graduation AG is moved. The movement of the second partial measuring graduation M is directed opposite the movement of the first partial measuring graduation AG because of the retroreflecting effect of the reflector element, i.e. it is upward directed. Because of the graduation period $d_2$ of the second measuring graduation, which is selected to be approximately $d_1/2$, the result is a Doppler shift of the partial light beam diffracted there of approximately twice the size in comparison to the Doppler shift at the first measuring graduation AG. In the course of a further passage through the third, or respectively the first partial measuring graduation AG', which is again moved downward, a further Doppler shift results, so that finally a signal frequency of approximately $8\Delta v$ results for the interference signal resulting from the two interfering partial light beams after the third partial measuring graduation AG'. This clearly shows, that a relative movement by the amount of $d_1/8$ already provides a complete scanning signal period.

Of course, further possibilities for varying the thoughts in connection with the invention also exist besides the explained variations.

Thus, it is possible, for example, to arrange the graduation structures in the partial measuring graduations not exactly parallel on the scale, but instead to turn them slightly with respect to each other. The result here in case of a relative movement between the scanning unit and the scale is a so-called moiré fringe system, which can be evaluated for obtaining position information.

With a further alternative for the generation of a fringe system that is modulated as a function of displacement, it would be possible to select a ratio of the graduation periods $d_1:d_2$, which is not selected to be exactly 2:1, but slightly differs from it. The result then is a so-caller vernier fringe system, which can also be evaluated for obtaining displacement information.

Moreover, if for example the graduation period of the first partial measuring graduation is made greater or smaller by a small amount, and the graduation period of the third partial measuring graduation smaller or greater by the same amount, interference fringes of the same inclination, so-called Brewster fringes, result. However, $d_1:d_2=2:1$ again applies. The generated Brewster fringes can again be used for obtaining phase-shifted signals in the focal plane of a downstream-located lens. Reference is again made in this connection to the above mentioned dissertation of J. Wilhelm "Dreigitterschrittgeber" [Three-grating Incremental Transducer] of the TU Hannover, 1978, in particular Ch. 3.7 and p. 78.

Therefore a number of embodiment options exist within the scope of the present invention for also generating the phase-shifted signals required for detecting the direction of movement.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. An optical position measuring system, comprising:
   a scale comprising at least two partial measuring graduations that have different graduation periods, wherein said at least two partial measuring graduations comprise a first partial measuring graduation with a coarse graduation period and a second partial graduation period with a fine graduation period;
   a scanning unit that is movable relative to said scale along a measuring direction, said scanning unit comprising:
      a light source that emits light beams;
      a reflector element; and
      a detector element, wherein the light beams emitted by the light source are deflected several times by the reflector element in the direction of the course of propagation of the emitted light beams and impinge several times on said scale before they impinge on said detector element, on which scanning signals, which are modulated as a function of displacement, are detected; and
      wherein said light beams emitted by the light source initially impinge on the first partial measuring graduation, the impinging light beams are diffracted a first time and deflected in a direction toward said reflector element, said deflected light beams are again deflected by said reflector element in a direction toward said second partial measuring graduation, where light beams impinging on said second partial measuring graduation are diffracted a second time and deflected in a direction so as to impinge on said reflector element, which again said reflector element deflects said impinging light beams in a direction toward said first partial measuring graduation, where said first partial measuring graduation diffracts impinging light beams for a third time and said three time diffracted light beams are deflected in a direction toward said detector element.

2. The optical position measuring system in accordance with claim 1, wherein said at least two partial measuring graduations are embodied as incident light incremental graduations, which have partial measuring graduation areas periodically arranged in said measuring direction.

3. The optical position measuring system in accordance with claim 1, wherein said first and second partial measuring graduations are each embodied as phase graduations, each of which suppresses the zeroth order of diffraction to a large extent.

4. The optical position measuring system in accordance with claim 1, wherein said coarse graduation period of said first partial measuring graduation is essentially twice as large as said fine graduation period of said second partial measuring graduation.

5. The optical position measuring system in accordance with claim 1, wherein said at least two partial measuring graduations are arranged parallel with respect to each other in said measuring direction.

6. The optical position measuring system in accordance with claim 1, wherein said at least two partial measuring graduations are linearly arranged, so that a linear relative movement between said scale and said scanning unit are detected.

7. The optical position measuring system in accordance with claim 1, wherein said at least two partial measuring graduations are circularly arranged, so that a rotary relative movement between said scale and said scanning unit is detected.

8. The optical position measuring system in accordance with claim 1, wherein said reflector comprises a prism.

9. The optical position measuring system in accordance with claim 8, wherein said prism has an axis of symmetry that lies between two of said at least two partial measuring graduations.

10. The optical position measuring system in accordance with claim 8, wherein said prism has an axis of symmetry that lies in the center of one of said at least two partial measuring graduations.

11. The optical position measuring system in accordance with claim 1, wherein said reflector comprises a ball reflector.

12. The optical position measuring system in accordance with claim 1, wherein said reflector comprises a Dyson lens.

13. The optical position measuring system in accordance with claim 1, wherein said reflector has an axis of symmetry that lies between two of said at least two partial measuring graduations.

14. The optical position measuring system in accordance with claim 1, wherein said reflector has an axis of symmetry that lies in the center of one of said at least two partial measuring graduations.

15. An optical position measuring system, comprising:
   a scale comprising at least two partial measuring graduations that have different graduation periods, wherein said at least two partial measuring graduations comprise:
      a first partial measuring graduation;
      a second partial measuring graduation that is substantially identical to said first partial measuring graduation; and
      a third partial measuring graduation, wherein said first, second and third partial measuring graduations are arranged parallel and adjoining each other in said measuring direction;
   a scanning unit that is movable relative to said scale along a measuring direction, said scanning unit comprising:
      a light source that emits light beams;
      a reflector element embodied and/or arranged in such a way that light beams which initially impinge on the optical position measuring system perpendicular to the measuring direction, after having acted on said first, second and third partial measuring graduations, emerge as interfering partial light beams in an exit direction which is also approximately vertically oriented in relation to said measuring direction; and
      a detector element, wherein the light beams emitted by the light source are deflected several times by the reflector element in the direction of the course of propagation of the emitted light beams and impinge several times on said scale before they impinge on said detector element, on which scanning signals, which are modulated as a function of displacement, are detected.

16. The optical position measuring system in accordance with claim 15, wherein said first partial measuring graduation is embodied as transmitted light incremental graduations, said second partial measuring graduation is embodied as transmitted light incremental graduations and said third partial measuring graduation is embodied as an incident light incremental graduation, wherein said first, second and third partial measuring graduations each have partial measuring graduation areas periodically arranged in said measuring direction.

17. The optical position measuring system in accordance with claim 15, wherein said at least two partial measuring graduations are linearly arranged, so that a linear relative movement between said scale and said scanning unit are detected.

18. The optical position measuring system in accordance with claim 15, wherein said at least two partial measuring graduations are circularly arranged, so that a rotary relative movement between said scale and said scanning unit is detected.

19. The optical position measuring system in accordance with claim 15, wherein said reflector comprises a prism.

20. The optical position measuring system in accordance with claim 19, wherein said prism has an axis of symmetry that lies between two of said at least two partial measuring graduations.

21. The optical position measuring system in accordance with claim 19, wherein said prism has an axis of symmetry that lies in the center of one of said at least two partial measuring graduations.

22. The optical position measuring system in accordance with claim 15, wherein said reflector comprises a ball reflector.

23. The optical position measuring system in accordance with claim 15, wherein said reflector comprises a Dyson lens.

24. The optical position measuring system in accordance with claim 15, wherein said reflector has an axis of symmetry that lies between two of said at least two partial measuring graduations.

25. The optical position measuring system in accordance with claim 15, wherein said reflector has an axis of symmetry that lies in the center of one of said at least two partial measuring graduations.

* * * * *